(12) United States Patent
Tuttle et al.

(10) Patent No.: US 6,280,480 B1
(45) Date of Patent: Aug. 28, 2001

(54) INDIRECT ILLUMINATION TAILLAMP ASSEMBLY FOR A VEHICLE

(75) Inventors: Darin D. Tuttle, Wyoming; Marc R. Cogswell, Grand Rapids, both of MI (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 0 days.

(21) Appl. No.: 09/428,062

(22) Filed: Oct. 27, 1999

Related U.S. Application Data (60) Provisional application No. 60/106,254, filed on Oct. 30, 1998.

(51) Int. Cl.$^7$ .................................................... F21V 7/00
(52) U.S. Cl. ......................... 632/518; 362/545; 362/241; 362/245; 362/800
(58) Field of Search .................................. 362/518, 545, 362/241, 247, 245, 800

(56) References Cited

U.S. PATENT DOCUMENTS

| | | | |
|---|---|---|---|
| 1,680,168 | 8/1928 | Ohaver | 362/517 |
| 4,420,797 | 12/1983 | Tohata | 362/496 |
| 5,373,280 | 12/1994 | Louy et al. | 340/425.5 |
| 5,471,371 | 11/1995 | Koppolu et al. | 362/555 |
| 5,570,951 | 11/1996 | Bertling et al. | 362/231 |
| 5,765,940 | 6/1998 | Levy et al. | 362/240 |
| 5,929,788 | * 7/1999 | Vukosic | 340/908.1 |
| 5,984,494 | * 11/1999 | Chapman et al. | 362/470 |

* cited by examiner

*Primary Examiner*—Alan Cariaso
*Assistant Examiner*—Ronald E. DelGizzi
(74) *Attorney, Agent, or Firm*—Rader, Fishman, Grauer & McGarry (57) ABSTRACT

A taillamp assembly for a vehicle is provided which comprises a housing having a first reflector and a second reflector and a lens mounted to the housing juxtaposed to the first and second reflectors. The lens preferably has first and second optic regions in register with the first and second reflectors. A lamp carrier is mounted to one of the housing and the lens and between the housing and the lens and has first and second sets of interconnected light-emitting semiconductor devices. The sets of light-emitting semiconductor devices are directed at a corresponding reflector and are electrically independent from one another. The first and second sets of light-emitting semiconductor devices can thereby be independently actuated to emit light toward the corresponding first and second reflectors and, in turn, outwardly through the lens. In another aspect, the taillamp assembly includes an optical unit for focusing the light from the light-emitting semiconductor devices to an area within the outer periphery of a reflector.

26 Claims, 7 Drawing Sheets

INDIRECT ILLUMINATION TAILLAMP ASSEMBLY FOR A VEHICLE

CROSS-REFERENCE TO RELATED APPLICATION

This application claims the benefit of U.S. Provisional Application No. 60/106,254, filed on Oct. 30, 1998.

BACKGROUND OF THE INVENTION

1. Field of the Invention

This invention relates to a taillamp assembly for a vehicle and, more particularly, to a taillamp assembly for a vehicle whereby illumination is first directed inwardly toward a reflector before being directed outwardly of the lamp housing. In another aspect, the invention also relates to a taillamp assembly for a vehicle whereby light-emitting diodes (LEDs) are employed.

2. Description of the Related Art

Figure 12:
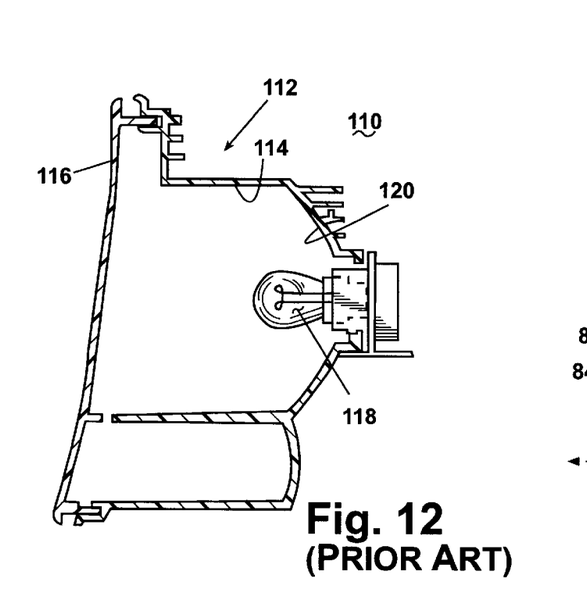
FIG. 12 is a cross-sectional view of a prior art lamp housing for a vehicle showing a conventional bulb-type lamp installed within a parabolic reflector housing.

It is common in vehicle taillamp assemblies to include a single housing which includes one or more red-colored tail and stop lamps, an amber-colored turn signal lamp, and a white reverse or back-up lamp. A cross section of one of these typical vehicle taillamp assemblies 110 is shown in FIG. 12 comprising a housing 112 having a reflector 114, a lens 16 disposed over an open end of the reflector housing 112 and a conventional bulb-type lamp 118. The bulb 118 is typically mounted in concentric relationship with respect to a parabolic portion 120 of the reflector 114 to direct illumination emitted from the lamp 118 outwardly of the housing 112 through the lens 116. Because conventional lamps 118 are typically white (i.e., transparent, crystal, colorless or clear) to emit the greatest amount of illumination therefrom, it is typical of the lens 116 to be provided with one or more colored portions corresponding to the type lamp signal required, i.e., red, amber, or white/transparent. Because the illumination from the lamp 118 must be directed outwardly from the housing 112, the parabolic portion 120 of the reflector 114 is typically placed rearwardly of the lamp 118 so that the parabolic portion 120 acts as a collection surface for direction of illumination outwardly of the housing 112 through the lens 116.

It has also been found that light-emitting diodes (LEDs) can be used in taillamp assemblies for vehicles. These types of vehicle taillamp assemblies typically must be arranged so that an axis of the LED is directed out of the housing for the taillamp assembly as well to ensure the maximum emission of light through the lens 116 of the taillamp assembly housing. Examples of vehicle taillamps including LED light sources are taught by U.S. Pat. No. 5,373,280 (issued Dec. 13, 1994), U.S. Pat. No. 5,570,951 (issued Nov. 5, 1996) and U.S. Pat. No. 5,765,940 (issued Jun. 16, 1998).

Unfortunately, the requirements that either the parabolic collecting surface be concentric with and behind the lamp 118 and the axis of the lamp 118 be directed in an uninterrupted fashion outwardly through the lens of the housing requires a wider profile for such lamps, increased servicing due to bulb burnout and breakage, and increased power consumption if conventional bulbs are used.

Other taillamp configurations have attempted to reduce the profile needed for the taillamp housing. For example, U.S. Pat. No. 1,680,168, issued Jan. 6, 1927, discloses a first, smaller reflector for a light bulb disposed within an upper portion of a taillamp housing. Light from the bulb is directed rearwardly at a second, larger reflector for "indirect" routing of the light from the taillamp housing. In the '168 patent, the light is reflected from the first reflector toward the rear of the taillamp housing, is redirected twice against the surface of the second reflector and outwardly through a lens mounted on the housing. A more recent example showing the indirect routing of light from an LED light source off of a reflective surface prior to the light exiting the housing through a lens is taught by U.S. Pat. No. 5,471,371, issued Nov. 28, 1995.

However, the prior art taillamp housings typically only house lamps of a single color requiring multiple housings to accommodate braking systems which include typical amber, red and white indicators. Further, the prior art taillamps typically require many manufacturing steps to make, specifically relating to the installation of light sources such as LEDs.

SUMMARY OF THE INVENTION

The invention relates to a taillamp assembly for a vehicle comprising a housing having a first reflector and a second reflector and a lens mounted to the housing juxtaposed to the first and second reflectors. The lens can have first and second optic regions in register with the first and second reflectors. A lamp carrier is preferably mounted to one of the housing and the lens and between the housing and the lens and has first and second sets of interconnected light-emitting semiconductor devices. The first set of light-emitting semiconductor devices are directed at the first reflector and the second set of light-emitting semiconductor devices are directed at the second reflector, and wherein the first and second sets of interconnected light-emitting semiconductor devices are electrically independent from one another. The first and second sets of light-emitting semiconductor devices can thereby be independently actuated to emit light toward the corresponding first and second reflectors and, in turn, outwardly through the lens.

The lamp carrier can be positioned between the first and second reflectors. The lamp carrier can comprise an elongated member with a Y-shaped cross section having a first leg mounting the first set of light-emitting semiconductor devices and a second leg mounting the second set of light-emitting semiconductor devices. At least one of the first and second reflectors can have a serrated surface shaped to redirect the light received from the corresponding set of light-emitting semiconductor devices in a direction generally normal to the plane of the lens. The serrated surface of the at least one of the first and second reflectors comprises a plurality of serrations, each of the serrations preferably comprising a leading surface and a trailing surface disposed at an obtuse angle with respect to one another whereby light received on the leading and trailing surfaces is reflected toward the lens. A focusing lens can be disposed between at least one of the first and second light-emitting semiconductor devices and the corresponding reflector for focusing light from the first and second light emitting semiconductor devices in a generally narrow band toward the corresponding reflector. The focusing lens can comprise a fresnel lens.

In another embodiment, the invention relates to a taillamp assembly for a vehicle comprising a housing having at least one reflector with an outer periphery, a lens mounted to the housing juxtaposed to the at least one reflector and having at least one optic region in register with the at least one reflector, and a lamp carrier mounted to one of the housing and the lens and between the housing and the lens and having at least one set of interconnected light-emitting semiconductor devices. The at least one set of light-emitting semiconductor devices is directed at the at least one reflector. In addition, an optical unit is preferably mounted between the at least one set of light-emitting semiconductor devices and the at least one reflector to focus light from the at least one set of light-emitting semiconductor devices generally within the outer periphery of the at least one reflector.

The optical unit can comprise a focusing lens and, more specifically, a fresnel lens. The optical unit can comprise a plurality of focusing lenses, each focusing lens in register with one of the light-emitting semi-conductor devices of the at least one set thereof, wherein each focusing lens focuses the light from the light-emitting semiconductor device within the outer periphery of the at least one reflector. Each focusing lens can focus the light from each of the light-emitting semi-conductor device into a relatively narrow band. The reflector can comprise a plurality of reflective surfaces offset with respect to each other, each reflective surface preferably being in register with a light-emitting semiconductor device. Light emitted from each of the light-emitting semiconductor devices is thereby focused by the optical unit onto an aligned reflective surface and, in turn, emanates from the reflective surface toward the lens in a set of relatively narrow bands of light. The at least one reflector can comprise a first reflector and a second reflector located in a spaced relationship to the first reflector. The lamp carrier can be positioned between the first and second reflectors.

Other objects, features, and advantages of the invention will be apparent from the ensuing description in conjunction with the accompanying drawings.

DETAILED DESCRIPTION OF THE PREFERRED EMBODIMENTS

Figure 1:
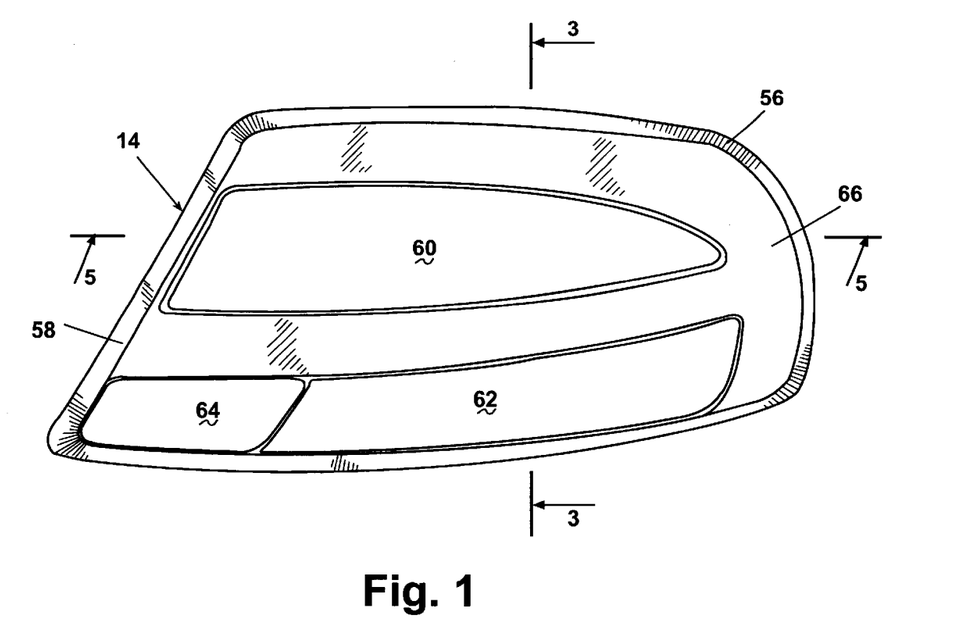
FIG. 1 is a front perspective view showing the vehicle taillamp assembly according to the invention.
Figure 2:
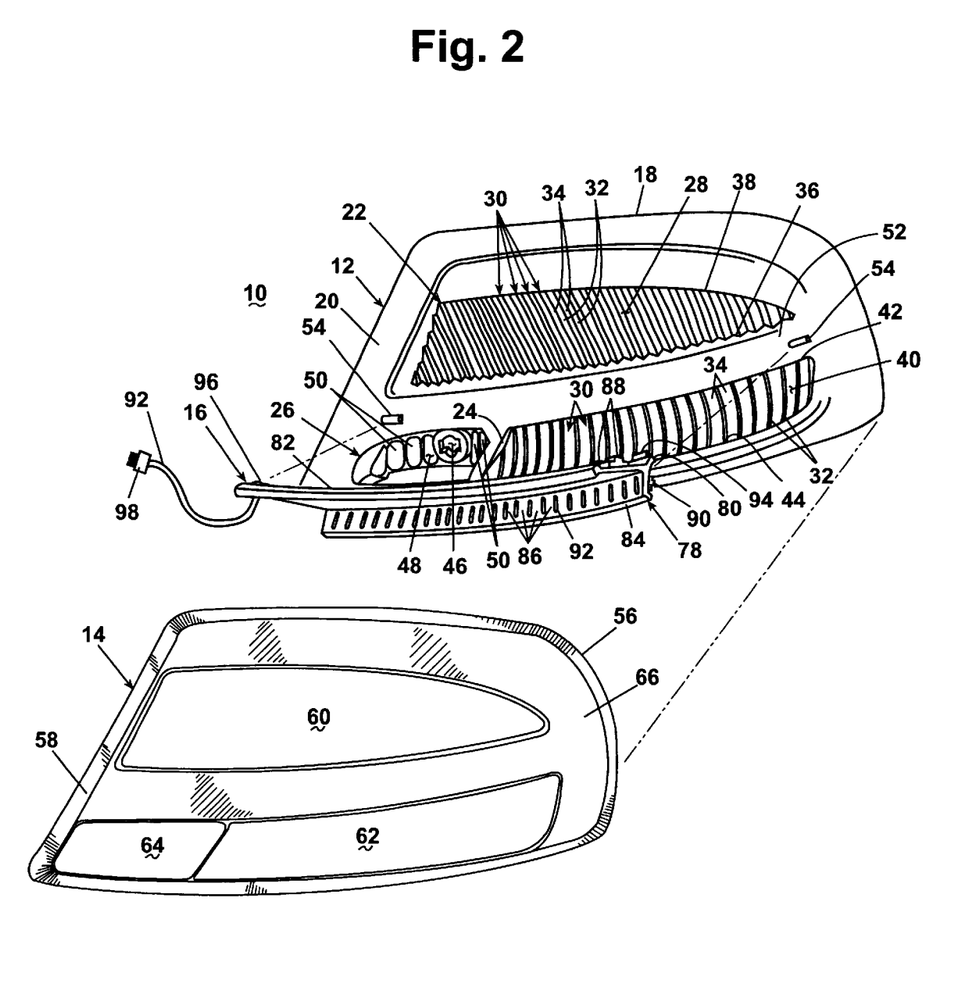
FIG. 2 is an exploded, perspective view of the vehicle taillamp assembly of FIG. 1 shown comprising a housing with discrete reflector chambers, an LED carrier, and a segmented lens corresponding to the chambers on the reflector housing.

Turning to FIGS. 1–2, a first embodiment of a vehicle lamp assembly 10 is shown comprising a housing 12, a lens 14, and a lamp carrier 16. Unless otherwise noted, all components are molded from a rigid synthetic resin material such as ABS, any suitable polycarbonate or an acrylic material or any other suitable material known in the art.

The housing 12 comprises a body 18 having a surface 20 provided with first, second, and third recesses 22, 24, and 26 adapted to provide tail and stop light, turn signal, and reverse indications, respectively. Although the position and configuration of the recesses 22–26 is described with particularity in this specification, it is contemplated that the recesses 22–26 could be placed in any order, configuration, and relationship without departing from the scope of this invention.

The first recess 22, configured to provide a tail and stop light indication typically found with vehicle brake lights, preferably extends in elongated longitudinal fashion across the width of the front face 20 of the housing 12 and includes a recessed surface 28 having several serrated reflection surfaces 30 thereon. Each reflection surface 30 is preferably formed by a leading surface 32 and a trailing surface 34 which are disposed at an approximate angle of 90 degrees with respect to one another. It has been found that the leading surface 32 can be an approximate width of 8 millimeters and the trailing surface 34 can have a width of approximately 2–13 millimeters.

Figure 3:
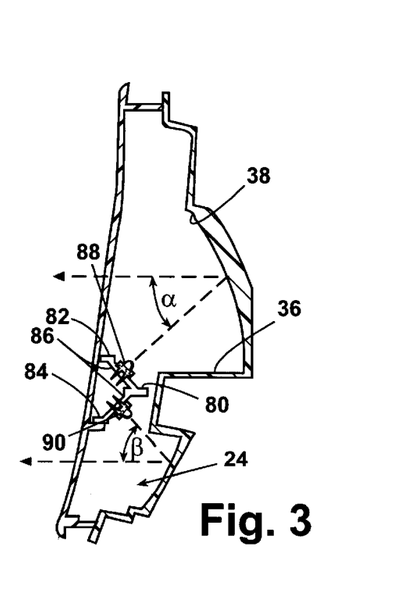
FIG. 3 is cross-sectional view taken along lines 3—3 of FIG. 1 showing the location of the LED carrier with respect to the lens and reflector housing.

As shown in FIG. 3, the recessed surface 28 of the first recess 22 is preferably offset from the front surface 20 of the housing 12 at its greatest extent along a lower edge 36 of the rear surface 28 which, in turn, curves upwardly in an arcuate fashion towards the front surface 20 and reaches its closest extent with regard to the front surface 20 at an upper edge 38 thereof. The radius of curvature of the rear surface 28 between the lower edge 36 and the upper edge 38 can preferably be 90 millimeters or approximately 100 degrees with respect to one another.

The second recess 24 preferably extends longitudinally along the lower portion of the housing 12 and has a recessed surface 40 formed with the reflection surfaces 30 having leading edges 32 and trailing edges 34 as described with respect to the first recess 22. The reflection surfaces 30 of the recessed surface 40 of the second recess 24 preferably are located farthest from the front surface 20 of the housing 12 along an upper edge 42 thereof and arc toward the front surface 20 of the housing 12 to their closet extent along a lower edge 44 of the recessed surface 40.

It will be understood that the angles, dimensions, and radii of curvature described with respect to the reflection surfaces 30, leading edge 32 and the trailing edge 34 of the recessed surfaces 28 and 40 of the first and second recesses 22 and 24 are described by example only. It is contemplated that the particular shape of the reflection surfaces 30 and the configuration of the recessed surfaces 28 and 40 must be selected to optimize light transmission directed outwardly of the housing 12 so as to emit the greatest amount of light therefrom.

The third recess 26, provided for reverse indication, is shown comprising a conventional lamp socket 46 disposed within a parabolic recessed surface 48 which, in turn, is provided with several reflection surfaces 50 thereon. The conventional lamp socket 46 is provided in the third recess 26 because, although it is a feature that the first and second recesses will receive illumination from LEDs, currently the technology does not exist to provide significant illumination from a white-colored LED. However, to the extent that such colorless LEDs become available, it is contemplated that the recessed surface 48 of the third recess 26 can be provided with the reflection surfaces 30 so that the recessed surface 48 of the third recess 26 is configured similarly to that of the recessed surfaces 28 and 40 of the first and second recesses 22 and 24.

As best shown in FIG. 2, the first recess 22 is spaced vertically from the second and third recesses 24 and 26 by a divider portion 52 on the front surface 20 of the housing 12. The divider portion 52 is provided with a pair of apertures 54 spaced horizontally from one another adjacent distal edges of the front surface 20 of the housing 12.

The lens 14 comprises a translucent member 56, preferably configured in shape to correspond with the front surface 20 of the housing 12, provided with a rigid perimeter portion 58. It will be understood that translucent, when used in this application, includes transparent items as well. Within the confines defined by the perimeter portion 58 are defined three regions: a first region 60 corresponding in shape and location on the lens 14 to the first recess 22 in the housing 12, a second region 62 corresponding in shape and location to the second recess 24 on the housing 12, and a third region 64 corresponding in shape and location to the third recess 26 on the housing 12. The remainder of the lens 14 located within the perimeter portion 58 not located within the regions 60–64 preferably defines a reflector region 66 generally comprising several small optical regions which are adapted to reflect light incident thereupon as is well known in the art. Although it is contemplated that the first region 60, second region 62, and third region 64 can be provided with a red, amber, and transparent/white lens portion thereon, it is also contemplated that these regions can be formed as transparent or crystal windows as well since the lamps carried on the lamp carrier 16 and within the lamp socket 46 can be colored as well, eliminating the need for the colored portion within each of the respective regions 60, 62, and 64.

Figure 5:
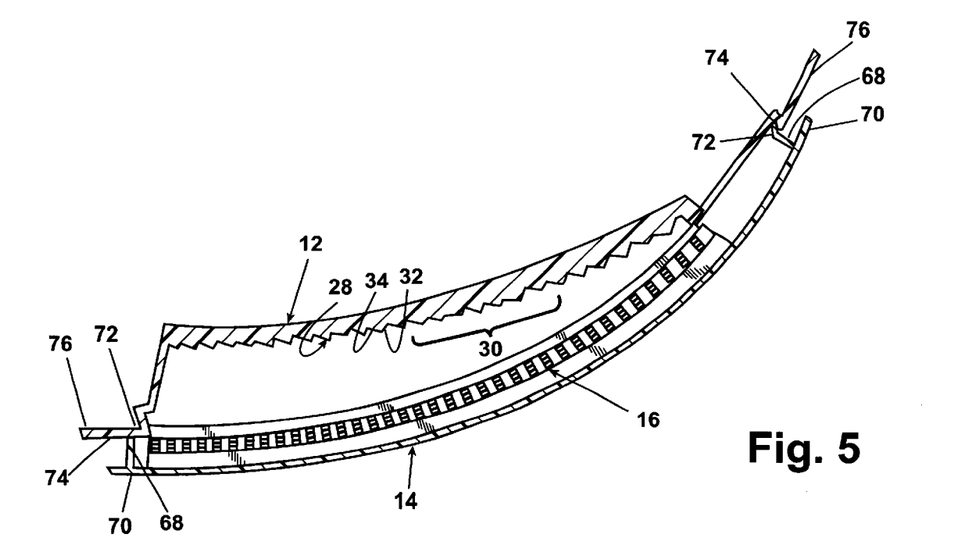
FIG. 5 is a cross-sectional view taken along lines 5—5 of FIG. 1 showing serrated reflector portions on the reflector housing for direction of light emitted from the LEDs outwardly of the reflector housing through the lens.
Figure 6:
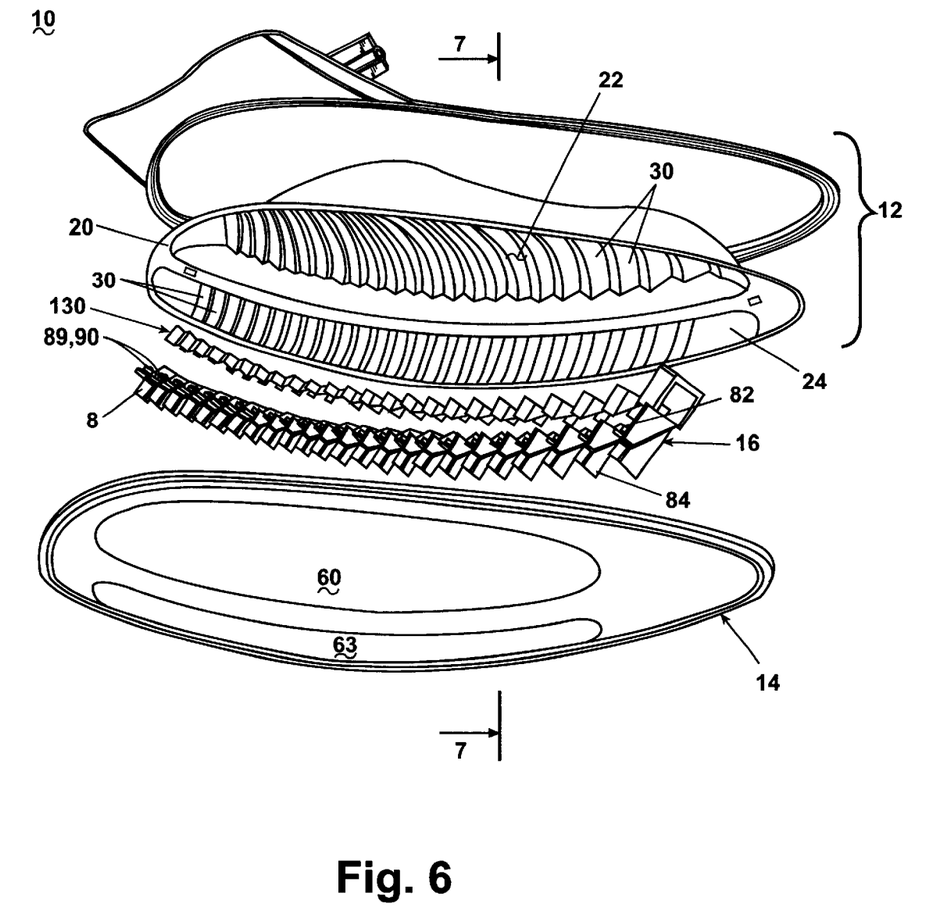
FIG. 6 is a an exploded, perspective view of a second embodiment of a vehicle taillamp assembly according to the invention comprising a housing with discrete reflector chambers, an LED carrier, a focusing lens, and a housing lens with optic portions corresponding to the chambers on the reflector housing.

As best shown in FIG. 5, the lens 14 has a pair of resilient arms 68 located adjacent each transverse edge 72 thereof. Each of the arms 68 preferably has a detent portion 72 thereon adapted to be received by mating slots 74 on aligned transverse edges 76 of the housing 12 to securely retain the lens 16 to the housing 12. Alternatively, it is contemplated that adhesives, conventional fasteners, welding methods and other well-known fastening methods can be employed to retain the lens 16 to the housing 12 without departing from the scope of this invention.

As shown in FIGS. 2 and 3, the LED carrier 16 comprises an elongated body 78 comprising a central beam 80 interconnected with upper and lower beams 82 and 84 by connectors 86. Preferably, each of the connectors 86 located between the central beam 80 and upper beam 82 mounts a red-colored LED 88. Preferably, each of the connectors 86 located between the central beam 80 and the lower beam 84 mounts an amber-colored LED 90. Each of the LEDs 88 is preferably connected along a common electrical interconnection and, moreover, each of the LEDs 90 is also interconnected along an additional electrical interconnection so that the sets of LEDs 88 and 90 can be actuated independently of one another (but in unison with the LEDs in each respective set 88, 90 ). A schematic electrical conduit 92 is shown in FIG. 2 which is preferably provided with an appropriate connector 98 for interconnection with vehicle braking and signaling electrical systems (not shown).

The LED carrier 16 preferably has a pair of detents 94 located adjacent each end of the central beam 78. The detents 94 and 96 are preferably mounted within the apertures 54 on the front face 20 of the housing 12 to retain the LED carrier against the divider portion 52 of the housing 12. For convenience, the electrical interconnection 92 can be fed through one of the apertures 54 to pass the electrical connection 92 to the rear of the housing 12 for interconnection with the vehicle electrical systems.

Figure 4:
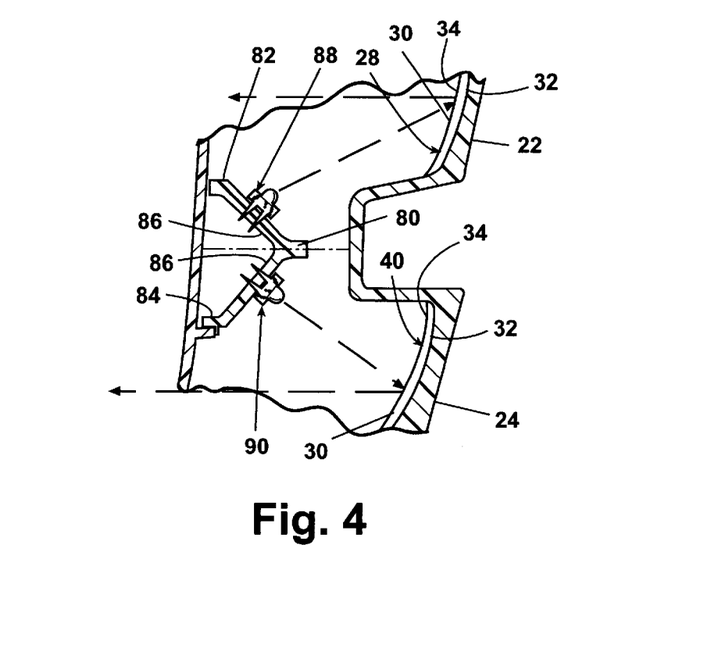
FIG. 4 is a fragmentary, enlarged view of the cross section of FIG. 3 showing the positioning of the LED carrier with respect to the various chambers of the reflector housing in greater detail.

As best shown in FIGS. 3–4, the red LEDs 88 are preferably directed upwardly at the recessed surface 28 of the first recess 22 at an angle of $\alpha$ with respect to the horizontal and the amber LEDs 90 are preferably directed downwardly at the recessed surface 40 of the second recess 24 at an angle of $\beta$ with respect to the horizontal once the LED carrier 16 is mounted to the housing 12. The lens 14 can then be mounted over the housing 12 and the LED carrier 16 in the manner previously described.

It will be understood that the recessed surfaces 28 and 40 of the first and second recesses 22 and 24 are preferably provided with a sufficient number of reflection surfaces 32 to optimally receive and reflect light emitted from the first and second LEDs 88 and 90 on the LED carrier 16. The leading and trailing surfaces 32 and 34 combined with the angle and curvature of the recessed surfaces 28 and 40 provide for wide distribution of light received from the LEDs 88 and 90, reflected off the surfaces 28 and 40, and outwardly through the regions 60 and 62 of the lens 14.

It has been found that the angle $\alpha$ of the first LEDs 88 is preferably between 30 and 60 degrees and, more specifically, about 48 degrees for the optimal angle of reflection for the configuration shown in the drawings. However, it is contemplated that the angle $\alpha$ can vary over a relatively wide range and depends upon the particular geometric configuration of taillamp employed. For example, the angle of reflection for a minivan-type taillamp can differ significantly from that for a luxury-type passenger vehicle or a compact car. It has also been found that the angle $\beta$ of reflection for the second LEDs 90 with respect to the recessed surface 40 of the second recess 24 is preferably between 30 and 60 degrees and, more specifically, about 48 degrees for the most optimal reflection for the configuration of the lamp assembly 10 shown in the drawings.

The lamp assembly 10 provides several benefits over prior art taillamp assemblies. First, the use of LEDs provides substantial power reduction because LEDs use substantially less wattage than conventional bulb-type lamps. Second, as can be seen by comparing the profile of the lamp assembly 10 according to the invention of FIG. 3 with the prior art lamp assembly 110 shown in FIG. 5, a substantially reduced depth profile is achieved so that the taillamp assembly 10 according to the invention takes up far less space when mounted to a vehicle. Further, the modular nature of the lamp assembly 10, namely, the ability of a repair worker to remove the lens 14, easily replace the LED carrier and/or bulb in the lamp socket 46 and then replace the lens 14 allows for greater ease and servicing. However, it is further contemplated that servicing may not even be required for substantially the life of the taillamp assembly 10 due to the extended life span of LED-type illuminator devices.

A standard bulb (not shown) can be mounted within the lamp socket 46 to provide a reverse indicator as required. If, as described above, transparent and/or white-colored LEDs are developed which emit sufficient light as needed, it is contemplated that the LED carrier 16 can be modified with a third set of LEDs which are aligned with the third recess 26 in the same manner as the LEDs 88, 90 in the first and second recesses 22 and 24.

A second embodiment of the lamp assembly 10 is shown in FIG. 6–9. It will be understood that elements common to the first embodiment of FIGS. 1–5 and the second embodiment of FIGS. 6–9 have been referred to with identical reference numerals. As in the first embodiment, the second embodiment of the vehicle lamp assembly 10 also comprises a housing 12, a lens 14, and a lamp carrier 16. The optical unit 130 is provided for the purpose of focusing light exiting the LEDs 88, 90 (which tends to scatter due to the point light source nature of the LEDs 88, 90) within the outer periphery of the reflective surfaces 30 of the first and second recesses 22 and 24 to prevent loss of light from the LEDs 88,90 due to scattering thereof. In this embodiment, the optical unit 130 generally comprises a lens located intermediate the LEDs 88, 90 and the housing 12 although other light transmittal and/or reflective members can be employed without departing from the scope of this invention. Such alternative arrangements could include a set of aligned mirrors located adjacent to the LEDs 88, 90 and intermediate the LEDs 88, 90 and the housing 12 to redirect scattering light toward the reflective surfaces 30 thereof.

Figure 7:
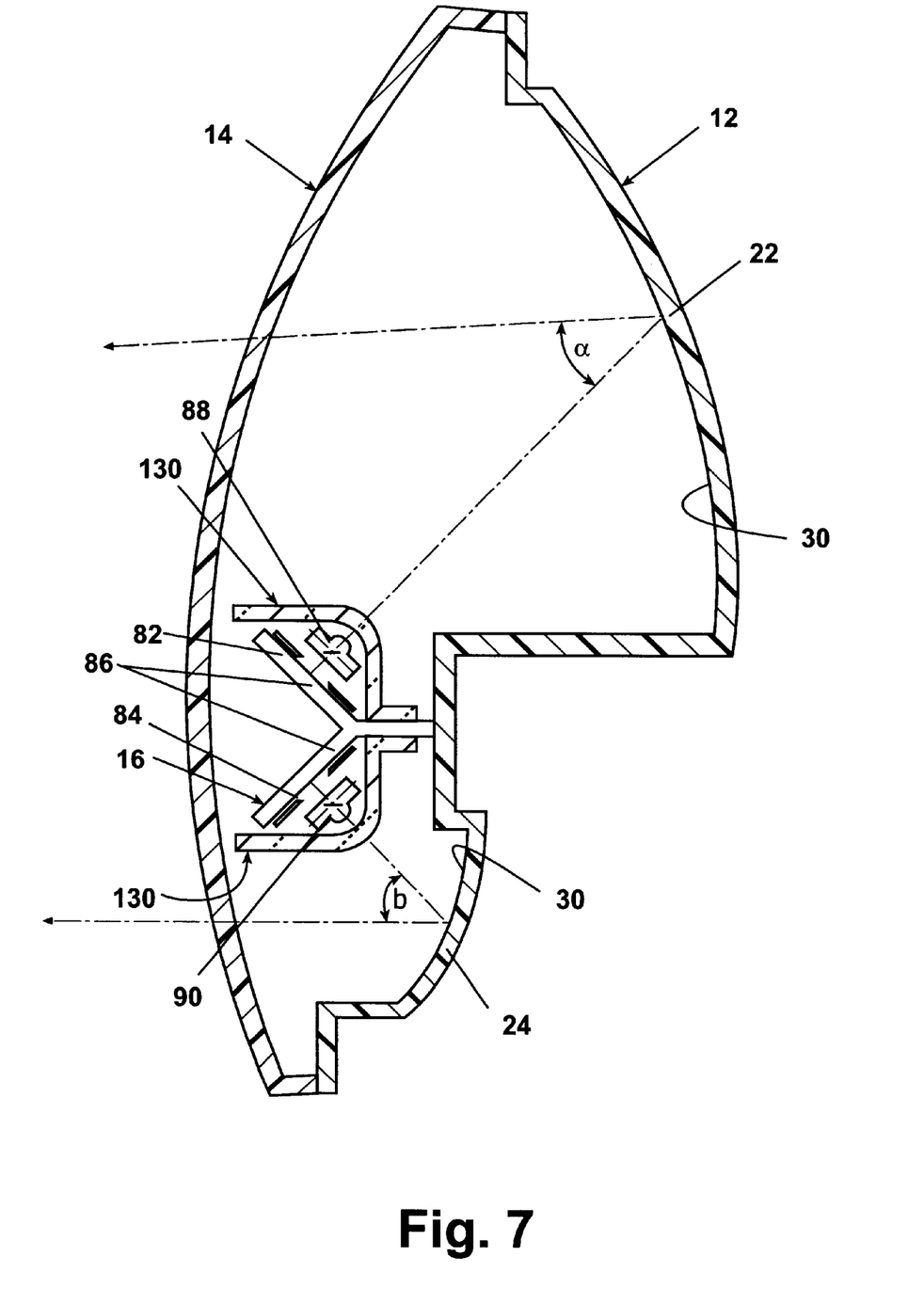
FIG. 7 is a is cross-sectional view of the assembled vehicle taillamp assembly of FIG. 6, and taken along lines 7—7 of FIG. 6, showing the location of the LED carrier and the focusing lens with respect to the housing lens and reflector housing.
Figure 9:
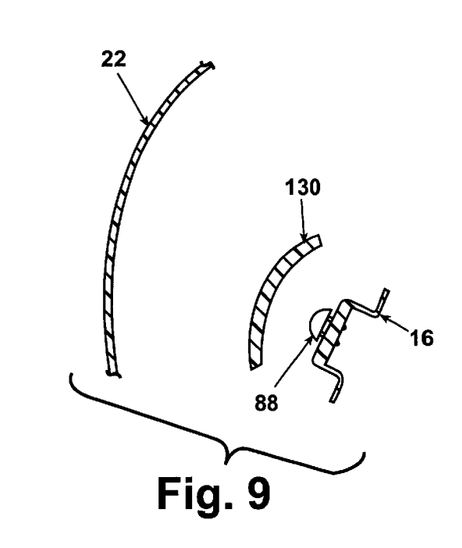
FIG. 9 is a cross-sectional view taken along lines 9—9 of FIG. 8.

FIGS. 7 and 9 show the mounting of the optical unit 130 within the housing 12 of the second embodiment of the taillamp assembly 10. The optical unit 130 preferably located between the LED light sources 88 and 90 and the corresponding reflective surface 30 of the first and second recesses 22 and 24. The optical unit 130 is preferably mounted to either the lamp carrier 16 or the housing 12 to locate the optical unit 130 in position.

Figure 8:
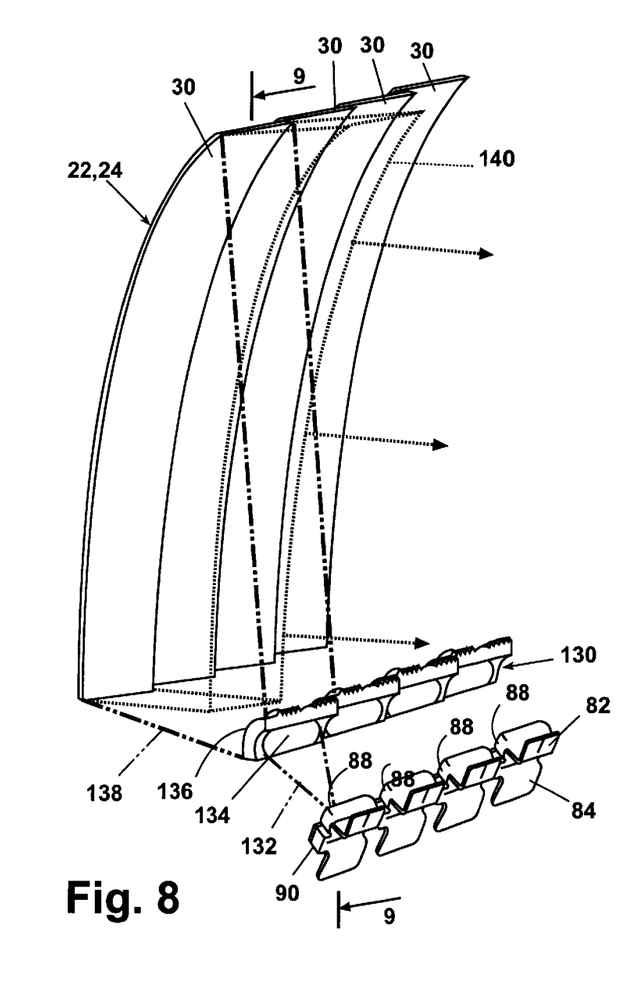
FIG. 8 is a perspective view of the LED light source, optical unit and a portion of a segmented reflector chamber of the vehicle taillamp assembly of FIG. 6 and showing the divergence of the light emitted from the LED light source into a vertical chord and, the reflectance of the light from the surface into a vertical plane of light.
Figure 10:
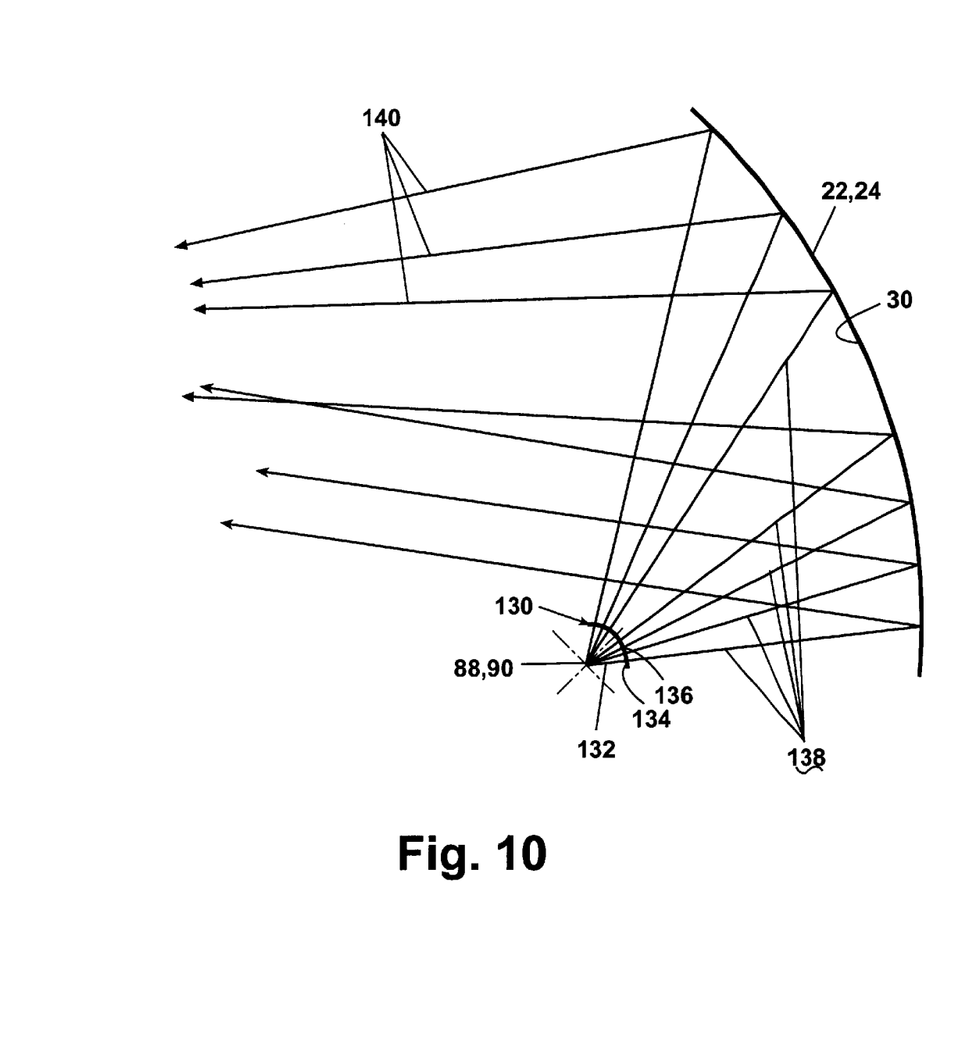
FIG. 10 is a schematic view along a vertical plane of the taillamp of FIG. 6 showing light rays emitted from the LED light source, through the optical unit and being reflected from the reflective surface of the reflector chamber.
Figure 11:
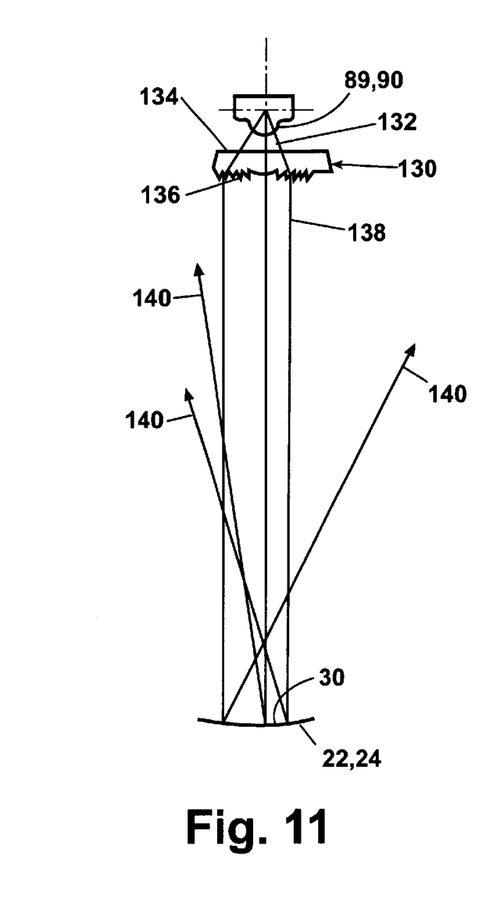
FIG. 11 is a schematic view along a horizontal plane of the taillamp of FIG. 6 showing light rays emitted from the LED light source, through the optical unit and being reflected from the reflective surface of the reflector chamber.

By example, the optical unit 130 is preferably a fresnel lens which, by definition, focuses light from a scattering source into a directed beam. This refocusing of the light emitted from the LEDs 88, 90 is shown in FIGS. 8 and 10–11 wherein emitted light 132 is directed onto a first surface 134 of the optical unit 130. The light is propagated through the optical unit 130 and exits a second, opposite surface 136 thereof. Light 138 is thereby emitted from the second surface 136 of the lens 130 and is received by the reflective surface 30 of the recess 22, 24 where the light is reflected outwardly through the lens 14. The reflected light is shown by reference numeral 140.

The optical unit 130 thereby enhances the proportion of light emitted by the LEDs 88, 90 and reduces the proportion of available light lost to scattering from the LEDs 88, 90. Further, the configuration of the LEDs 88, 90, optical unit 130 and the reflective surface 30 of the recess 22, 24 is designed to convert a point light source such as an LED 88, 90 into a generally planar reflection which can be aesthetically-pleasing when transmitted through a colored filter such as the lens 14 while still maintaining sufficient luminosity to comply with government and industry standards for light transmission and visibility.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

PARTS LIST

| | | | |
|---|---|---|---|
| 10 | lamp assembly | 52 | divider portion |
| 12 | housing | 54 | apertures |
| 14 | lens | 56 | translucent member |
| 16 | lamp carrier | 58 | rigid perimeter portion |
| 18 | body | 60 | first region |
| 20 | first surface | 62 | second region |
| 22 | first recess | 64 | third region |
| 24 | second recess | 66 | reflector region |
| 26 | third recess | 68 | resilient arms |
| 28 | recessed surface | 70 | |
| 30 | reflection surface | 72 | transverse edge |
| 32 | leading surface | 74 | slots |
| 34 | trailing surface | 76 | transverse edges |
| 36 | lower edge | 78 | elongated body |
| 38 | upper edge | 80 | central beam |
| 40 | recessed surface | 82 | upper beam |
| 42 | upper edge | 84 | lower beam |
| 44 | lower edge | 86 | connectors |
| 46 | conventional lamp socket | 88 | red-colored LED |
| 48 | parabolic recessed surface | 90 | amber-colored LED 90 |
| 50 | reflection surfaces | 92 | conduit |
| 94 | detents | 136 | second surface |
| 96 | detents | 138 | light emitted by lens 130 |
| 98 | connector | 140 | reflected light |
| 100 | | 144 | |
| 102 | | 146 | |
| 104 | | 148 | |
| 106 | | 150 | |
| 108 | | 152 | |
| 110 | taillamp assembly | 154 | |
| 112 | housing | 156 | |
| 114 | reflector | 128 | |
| 116 | lens | 160 | |
| 118 | conventional incandescent bulb | 162 | |
| 120 | parabolic region | 164 | |
| 122 | | 166 | |
| 124 | | 168 | |
| 126 | | 170 | |
| 128 | | 172 | |
| 130 | optical unit | 174 | |
| 132 | light emitted by LEDs | 176 | |
| 134 | first surface | 178 | |

What is claimed is:

1. A taillamp assembly for a vehicle comprising:
   a housing having a first reflector and a second reflector, the first and second reflectors configured to emit light in a generally common direction;
   a lens mounted to the housing in an opposing relationship to the first and second reflectors, the lens has first and second optic regions in optical register with the first and second reflectors; and
   a lamp carrier mounted to one of the housing and the lens and between the housing and the lens, the lamp carrier having first and second sets of interconnected light-emitting semiconductor devices, wherein the first set of light-emitting semiconductor devices is directed at the first reflector and the second set of light-emitting semiconductor devices is directed at the second reflector, and wherein the first and second sets of interconnected light-emitting semiconductor devices are electrically independent from one another;
   whereby the first and second sets of light-emitting semiconductor devices can be independently actuated to emit light toward the corresponding first and second reflectors and, in turn, outwardly through the lens.

2. The taillamp assembly of claim 1 wherein the lamp carrier is positioned between the first and second reflectors.

3. The taillamp assembly of claim 2 wherein the lamp carrier comprises an elongated member with a Y-shaped cross section having a first leg mounting the first set of light-emitting semiconductor devices and a second leg mounting the second set of light-emitting semiconductor devices.

4. The taillamp assembly of claim 3 wherein at least one of the first and second reflectors has a serrated surface shaped to redirect the light received from the corresponding set of light-emitting semiconductor devices in a direction generally normal to the plane of the lens.

5. The taillamp assembly of claim 4 wherein the serrated surface of the at least one of the first and second reflectors comprises a plurality of serrations, each of the serrations comprising a leading surface and a trailing surface disposed at an obtuse angle with respect to one another whereby light received on the leading and trailing surfaces is reflected toward the lens.

6. The taillamp assembly of claim 5 and further comprising a focusing lens disposed between at least one of the first and second light-emitting semiconductor devices and the corresponding reflector for focusing light from the first and second light emitting semiconductor devices in a generally narrow band toward the corresponding reflector.

7. The taillamp assembly of claim 6 wherein the focusing lens is a fresnel lens.

8. The taillamp assembly of claim 1 wherein at least one of the first and second reflectors comprises a plurality of reflective surfaces offset with respect to each other, each reflective surface being in register with a light-emitting semiconductor device, whereby light emitted from each of the light-emitting semiconductor devices is directed onto an aligned reflective surface and, in turn, eminates from the reflective surface toward the lens in a set of relatively narrow bands of light.

9. The taillamp assembly of claim 1 wherein the lamp carrier comprises an elongated member with a Y-shaped cross section having a first leg mounting the first set of light-emitting semiconductor devices and a second leg mounting the second set of light-emitting semiconductor devices.

10. The taillamp assembly of claim 1 wherein at least one of the first and second reflectors has a reflective surface shaped to redirect the light received from the corresponding set of light-emitting semiconductor devices in a direction generally normal to the plane of the lens.

11. The taillamp assembly of claim 10 wherein the reflective surface of the at least one of the first and second reflectors comprises a plurality of reflective surfaces, each of the reflective surfaces comprising a leading surface and a trailing surface disposed at an obtuse angle with respect to one another whereby light received on the leading and trailing surfaces is reflected toward the lens.

12. The taillamp assembly of claim 1 and further comprising a focusing lens disposed between at least one of the first and second light-emitting semiconductor devices and the corresponding reflector for focusing light from the first and second light emitting semiconductor devices in a generally narrow band toward the corresponding reflector.

13. The taillamp assembly of claim 12 wherein the focusing lens is a fresnel lens.

14. A taillamp assembly for a vehicle comprising:
   a housing having at least one reflector, the reflector having an outer periphery;
   a lens mounted to the housing juxtaposed to the at least one reflector, the lens has at least one optic region in register with the at least one reflector;
   a lamp carrier mounted to one of the housing and the lens and between the housing and the lens, the lamp carrier having at least one set of interconnected light-emitting semiconductor devices, wherein the at least one set of light-emitting semiconductor devices is directed at the at least one reflector; and
   an optical unit mounted between the at least one set of light-emitting semiconductor devices and the at least one reflector to focus light from the at least one set of light-emitting semiconductor devices generally within the outer periphery of the at least one reflector.

15. The taillamp assembly of claim 14 wherein the optical unit comprises a focusing lens.

16. The taillamp assembly of claim 15 wherein the focusing lens comprises a fresnel lens.

17. The taillamp assembly of claim 16 the optical unit comprises a plurality of focusing lenses, each focusing lens in register with one of the light-emitting semi-conductor devices of the at least one set thereof, wherein each focusing lens focuses the light from the light-emitting semiconductor device within the outer periphery of the at least one reflector.

18. The taillamp assembly of claim 17 wherein each focusing lens focuses the light from each of the light-emitting semi-conductor device into a relatively narrow band.

19. The taillamp assembly of claim 18 wherein the reflector comprises a plurality of reflective surfaces offset with respect to each other, each reflective surface being in register with a light-emitting semiconductor device, whereby light emitted from each of the light-emitting semiconductor devices is focused by the optical unit onto an aligned reflective surface and, in turn, eminates from the reflective surface toward the lens in a set of relatively narrow bands of light.

20. The taillamp assembly of claim 19 wherein the at least one reflector comprises a first reflector and a second reflector located in a spaced relationship to the first reflector.

21. The taillamp assembly of claim 20 wherein the lamp carrier is positioned between the first and second reflectors.

22. The taillamp assembly of claim 14 the optical unit comprises a plurality of focusing lenses, each focusing lens in register with one of the light-emitting semi-conductor devices of the at least one set thereof, wherein each focusing lens focuses the light from the light-emitting semiconductor device within the outer periphery of the at least one reflector.

23. The taillamp assembly of claim 22 wherein each focusing lens focuses the light from each of the light-emitting semi-conductor device into a relatively narrow band.

24. The taillamp assembly of claim 14 wherein the at least one reflector comprises a plurality of reflective surfaces offset with respect to each other, each reflective surface being in register with a light-emitting semiconductor device, whereby light emitted from each of the light-emitting semi-conductor devices is focused by the optical unit onto an aligned reflective surface and, in turn, eminates from the reflective surface toward the lens in a set of relatively narrow bands of light.

25. The taillamp assembly of claim 14 wherein the at least one reflector comprises a first reflector and a second reflector located in a spaced relationship to the first reflector.

26. The taillamp assembly of claim 25 wherein the lamp carrier is positioned between the first and second reflectors.

* * * * *